(12) United States Patent
Tanuma et al.

(10) Patent No.: US 6,203,593 B1
(45) Date of Patent: Mar. 20, 2001

(54) CERAMIC FILTER AND METHOD OF FILTRATING MOLTEN METAL USING THE SAME

(75) Inventors: Eigo Tanuma, Yokohama; Takashi Tokugawa, Tokyo, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/195,432

(22) Filed: Nov. 18, 1998

(30) Foreign Application Priority Data

Nov. 18, 1997 (JP) ...................................... 9-333539

(51) Int. Cl.$^7$ ....................................................... C22B 9/02
(52) U.S. Cl. ............................ 75/407; 266/227; 266/238
(58) Field of Search .................................. 266/227, 238; 75/407

(56) References Cited

U.S. PATENT DOCUMENTS

| 4,302,502 | 11/1981 | Narumiya . |
| 4,697,632 | 10/1987 | Lirones . |
| 4,713,180 | 12/1987 | Hofmann et al. . |
| 4,789,140 | * 12/1988 | Lirones ................................. 75/407 |
| 5,676,833 | * 10/1997 | Odaka et al. ................... 210/500.26 |

FOREIGN PATENT DOCUMENTS

406049551 * 2/1994 (JP) ...................................... 266/227

* cited by examiner

*Primary Examiner*—Melvyn Andrews
(74) *Attorney, Agent, or Firm*—Sughrue, Mion, Zinn, Macpeak & Seas, PLLC

(57) ABSTRACT

A ceramic filter arranged in a flow passage through which a molten metal is poured from a gate into a cavity of a casting mold. The ceramic filter has a ceramic main body of a three-dimensional reticulated skeleton structure having interconnected pores. The main body is formed into a cylindrical shape having an inner hollow portion. A method of making the ceramic main body is disclosed by applying a ceramic slurry on a reticulated synthetic resin foam having no cell membranes. The foam is sintered and applied with the ceramic slurry until the foam is removed by carbonization.

9 Claims, 3 Drawing Sheets

CERAMIC FILTER AND METHOD OF FILTRATING MOLTEN METAL USING THE SAME

BACKGROUND OF THE INVENTION

The present invention relates to a ceramic filter suitable for filtration of a molten metal, particularly, a molten ferrous metal, and to a method of filtering a molten metal using the ceramic filter.

A three-dimensional reticulated skeleton structure having interconnected pores, typically a ceramic foam produced from a synthetic resin foam has been known to be useful for filtration of a molten non-ferrous metal such as molten magnesium, aluminum or copper, or a molten ferrous metal such as molten ductile cast iron, gray cast iron or cast stainless steel. Such a filter has been generally formed into a rectangular or circular plate.

In the filtration of a molten metal, there is a difference between a molten ferrous metal and a molten non-ferrous metal in terms of the amount of the molten metal having passed through the filter for each filtration. To be more specific, the filtrated amount of a molten non-ferrous metal has been in a range from several ten tons to several hundreds tons; while the filtrated amount of a molten ferrous metal has been in a range from several ten kg to several tons. With respect to the usage of the filter, in general, the filter has been pre-heated for a molten non-ferrous metal; while it has not been pre-heated for a molten ferrous metal. Accordingly, as the filter used for a molten ferrous metal, a filter made from a ceramic material which is excellent in thermal shock resistance and has a structure in which the molten ferrous metal is smoothly passed therethrough is required. More specifically, there has been generally used a filter made from silicon carbide and having a structure being relatively small in the number of pores (i.e., relatively large in the size of pores) for reducing the resistance upon passing through the pores. Such a filter, however, has a problem in terms of strength if it is intended to make the thickness of the filter thinner for further reducing the resistance when the molten metal passed therethrough: and also has a problem in terms of corrosion resistance because the filtration of a molten ferrous metal in an amount of several tons takes a time of one minute or more. This corrosion occurs due to the reaction of silicon carbide with iron, and more specifically, pouring the molten metal for one minute or more may corrode the skeleton of the ceramic foam filter, thus the function of the filter is obstructed. In order to solve such an inconvenience, there is disclosed a technique to coat the surface of a skeleton of the ceramic foam filter with alumina being less reactive with iron, in Japanese Patent Laid-open No. Hei 5-51278; however, the coating of the skeleton with alumina is not yet sufficient to prevent corrosion of the skeleton.

With respect to the above filter for a molten ferrous metal, it has been proposed a method of increasing the total surface area of the filter for shortening the pouring time; however, such a method has a problem that since the filter is not pre-heated, the use of the filter having the increased surface area tends to reduce the temperature of the molten metal, leading to a failure in flow of the molten metal and also to breakage of the filter due to thermal shock. The problem has been solved by reducing the size of the filter and providing several gates to disperse thermal shock applied to each filter. This method, however, has presented another problem making difficult the design of a cavity of a casting mold, and in prolonging the filtrating time and making the corrosion resistance poor because of the presence of a plurality of the gates.

As described above, in filtration of a molten ferrous metal, particularly, a molten cast iron, since the molten metal must be poured in a casting mold for a short period of time, the related art filter having a rectangular or circular shape is poor in resistance against thermal shock and corrosion, particularly, when the molten metal in an amount of several tons or more is poured, resulting in the increased percent defective.

SUMMARY OF THE INVENTION

Therefore, an object of the present invention is to provide a ceramic filter of a ceramic porous structure which is excellent in thermal shock resistance and filtration performance, and is capable of, even in filtration of a large amount of a molten metal, particularly, a molten cast iron, enhancing the resistance against thermal shock and corrosion, uniformly dispersing a stress caused by thermal shock, and making the filtration area in a cavity wider than that of the plate-like ceramic filter. Another object of the present invention is to provide a method of filtrating a molten metal using the ceramic filter.

According to a first aspect of the present invention, there is provided a ceramic filter arranged in a flow passage through which a molten metal is poured from a gate into a cavity of a casting mold, the ceramic filter including: a ceramic main body of a three-dimensional reticulated skeleton structure having interconnected pores; wherein the main body is formed into a cylindrical shape having an inner hollow portion.

According to a second aspect of the present invention, in addition to the configuration described in the first aspect, the ceramic main body is produced by applying a ceramic slurry on a reticulated synthetic resin foam having no cell membranes and sintering the foam applied with the ceramic slurry until the foam is removed by carbonization.

According to a third aspect of the present invention, in addition to the configuration described in the first or second aspect, the ceramic main body is made of a ceramic having a melting point or sublimating point of 1000° C. or more.

According to a fourth aspect of the present invention, in addition to the configuration described in the first, second, or third aspect, the ceramic main body has a bulk specific gravity within a range from 0.3 to 0.8; the number of pores within a range from 3 to 40 per 2.5 cm in length along the straight line; and a porosity at 65% or more.

According to a fifth aspect of the present invention, there is provided a method of filtering a molten metal, including the steps of: arranging the ceramic filter described in the first, second, third or fourth aspect in a flow passage through which a molten metal is poured from a gate into a cavity of a casting mold in such a manner that the molten metal is allowed to flow from outside of a peripheral wall portion of the filter main body of the ceramic filter into an inner hollow portion of the filter main body through the interconnected pores of the peripheral wall portion and to flow out of the filter main body through a lower end opening portion of the filter main body; and allowing the molten metal to flow in the filter main body through the peripheral wall portion and to flow out of the filter main body through the lower end opening portion of the filter main body, thereby removing foreign matters in the molten metal when the molten metal passes through the interconnected pores of the peripheral wall portion of the filter main body.

According to a sixth aspect of the present invention, there is provided a method of filtering a molten metal, including the steps of: arranging the ceramic filter described in the first, second, third or fourth aspect in a flow passage through which a molten metal is poured from a gate into a cavity of a casting mold in such a manner that the molten metal is allowed to flow from an upper end opening portion of the filter main body of the ceramic filter into an inner hollow portion of the filter main body and to flow out of the filter main body through a peripheral portion of the filter main body; and allowing the molten metal to flow into the ceramic main body from the upper end opening portion of the filter main body and to flow out of the filter main body through the interconnected pores of the peripheral wall portion of the filter main body, thereby removing foreign matter in the molten metal when the molten metal passes through the interconnected pores of the peripheral wall portion of the filter main body.

The ceramic filter of the present invention is characterized by including a ceramic main body composed of a cylindrical ceramic porous body having a three-dimensional reticulated skeleton structure, wherein the ceramic main body is preferably specified as described in the second, third or fourth aspect, and accordingly, the filter is capable of suitably filtering a molten cast iron in an amount of several tons for a short period of time without occurrence of breakage and corrosion of the filter.

DETAILED DESCRIPTION OF THE PREFERRED EMBODIMENT

A preferred embodiment of the present invention will be described with reference to the accompanying drawings.

Figure 1:
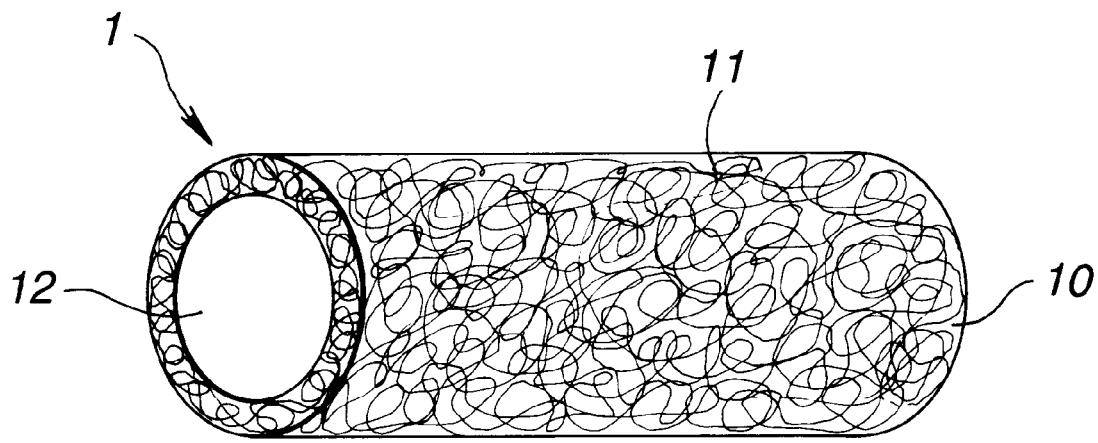
FIG. 1 is a perspective view of a ceramic filter according to one embodiment of the present invention.

Referring to FIG. 1, there is shown a ceramic filter of the present invention which includes a filter main body 10. The filter main body 10 is composed of a cylindrical ceramic porous body of a three-dimensional reticulated skeleton structure having interconnected pores or open cells. Although the cylindrical filter main body 10 has a circular ring-like shape in FIG. 1, it is not limited thereto. The cylindrical filter main body 10 may have an oval, triangle, square or polygonal (pentagonal or more) ring-like shape so long as it has an inner hollow portion. The height or length of the cylindrical filter main body is preferably in a range of 3 to 1,000 mm, more preferably 150 to 650 mm.

Figure 2:
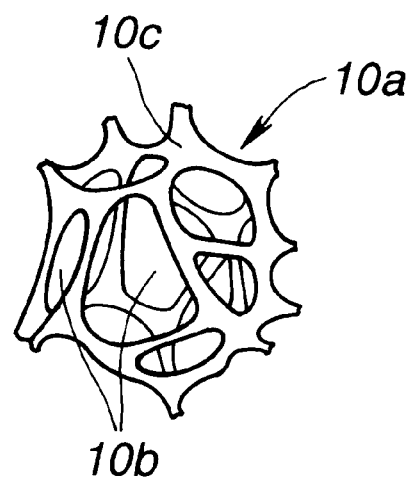
FIG. 2 is an enlarged perspective view of a part of a filter main body (ceramic foam)

As the ceramic porous body, there may be used a ceramic foam produced by applying a ceramic slurry on a synthetic resin foam, and drying and sintering the foam applied with the ceramic slurry; or there may be used a ceramic noodle formed by overlapping a ceramic rod in a loop by extrusion-molding. In particular, there is preferably used a ceramic foam having a lattice structure of a regular dodecahedron cell type produced from a reticulated flexible polyurethane foam having no cell membranes, which ceramic foam is small in pressure loss. More specifically, as shown in FIG. 2, the ceramic foam 10a has a three-dimensional reticulated skeleton structure having a number of interconnected open cells 10b which are defined by interconnected strands 10c and constitute continuous passages for a molten metal.

The ceramic for forming the ceramic porous body is preferably of a type having a melting point or sublimating point of 1000° C. or more. Specifically, examples of the ceramics include a non-oxide ceramic such as silicon carbide and silicon nitride, and an oxide ceramic such as alumina, silica, aluminum phosphate, calcia, magnesia and cordierite. These ceramic materials may be used singly or in combination.

The ceramic material may be suitably selected depending on a molten metal to be filtered or the filtration procedure. For example, for filtration of a molten cast iron, the ceramic material used must be excellent in thermal shock resistance because the molten cast iron is directly dropped on the ceramic filter kept at room temperature and is poured into a sand mold in a short time. In this case, the gate portion is made from a material selected from those reactive with iron and finally meltable because the gate portion is recovered as a return member. As the ceramic material having such characteristics, there may be used silicon carbide or silicon nitride. In general, there is used a material mainly containing silicon carbide which is incorporated with alumina, aluminum phosphate or silica as a sintering binder.

The main body of the ceramic filter according to the present invention preferably has a bulk specific gravity within a range from 0.3 to 0.8 because it must withstand thermal shock caused at the time when a molten cast iron is dropped onto the ceramic filter. When the bulk specific gravity is less than 0.3, the ceramic filter would not withstand the above thermal shock, leading to the breakage. When it is more than 0.8, there may occur blocking of the interconnected pores by the ceramic material upon the preparation of ceramic filter. This may retard the passing of the molten metal through the ceramic filter, tending to deteriorate the quality of the cast product. The bulk specific gravity of the main body is preferably in a range from 0.45 to 0.7.

The number of pores may be in a range from 3 to 40, preferably 4 to 20 per 2.5 cm in length along a straight line. When the number of pores is less than 3, the flowability of a molten metal is good but the filtrating efficiency is poor because of the large diameters of the pores. When it is more than 40, there occurs blocking of the interconnected pores by the ceramic material upon the preparation of ceramic filter, tending to lower the flowability of the molten metal. The number of pores is more preferably in a range from 6 to 13.

The porosity, which is dependent on the density and the bulk specific gravity of a material used for the ceramic porous body, may be at 65% or more, preferably 75 to 85%. When it is less than 65%, the flowability of a molten metal is lowered, tending to prolong the pouring time.

The ceramic filter of the present invention can be produced in accordance with a known process such as roll impregnation. To form a cylindrical ceramic porous body, there can be adopted the following two methods. One method is to convert a reticulated polyurethane foam into a ceramic body and to form the ceramic body into a cylindrical shape by secondary machining. The other method is to form a polyurethane foam into a cylindrical shape and then to convert the cylindrical polyurethane foam into a ceramic body. The secondary machining in the former method, which is performed for a ceramic body after conversion from a polyurethane foam into the ceramic body, takes a lot of time and makes it difficult to ensure a good dimensional accuracy. As a result, to form a cylindrical ceramic porous body, the latter method is preferable.

Figure 3A:
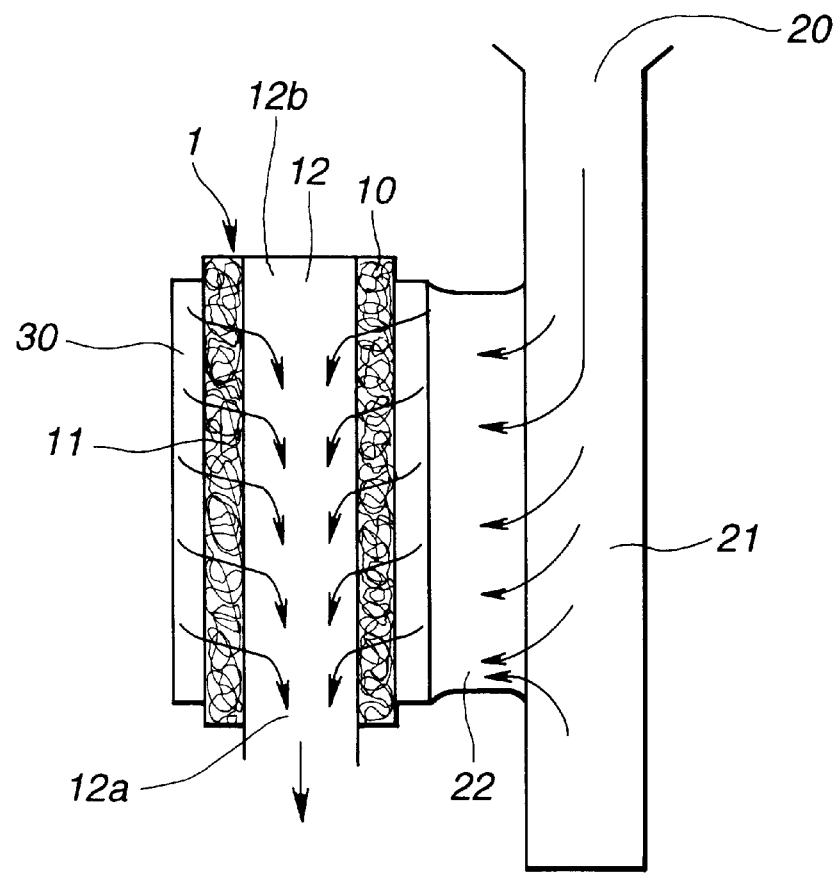
FIGS. 3A and 3B are a sectional front view and a transverse sectional view, respectively, showing one arrangement of the filter shown in FIG. 1.
Figure 3B:
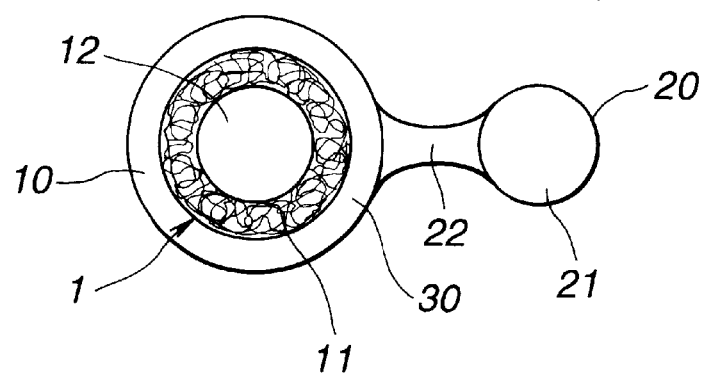

The ceramic filter of the present invention is, as shown in FIGS. 3A and 3B, arranged in a flow passage between a gate and a cavity of a casting mold. Referring to FIGS. 3A and 3B, reference numeral 20 denotes a gate; 21 is a gate stick; 22 is a runner; and 1 is the ceramic filter of the present invention which is arranged on one side of the runner 22 at a position over the casting mold (not shown). The filter 1 is arranged such that a ring-shaped molten metal passage 30 is formed outside of a peripheral wall portion 11 of a filter main body 10 of the filter 1. In such an arrangement, a molten metal flows from the gate 20 into the ring-shaped molten metal passage 30 through the gate stick 21 and the runner 22, and foreign matter in the molten metal is removed while the molten metal flows from outside of the peripheral wall portion 11 of the filter main body 10 through three-dimensional interconnected pores of the peripheral wall portion 11. The molten metal, which has been subjected to filtration, flows into a hollow portion 12 of the filter main body 10, and then flows into the cavity of the casting mold through the lower end opening portion 12a of the hollow portion 12.

By arranging the cylindrical ceramic filter of the present invention between the cavity and the gate as described above, the cast amount per unit time is increased because the entire peripheral portion of the filter can be taken as the molten metal flow-in portion although in the related art rectangular or circular filter has only uni-directional molten metal flow-in portion.

In the example shown in FIGS. 3A and 3B, only one filter is arranged on one side of the gate stick; however, a plurality of the filters can be arranged. For example, two pieces of the filters may be arranged on both sides of the gate stick.

In the above example, molten metal is allowed to flow from outside of the peripheral wall portion 11 of the filter main body 10 into the hollow portion 12; however, with respect to the flow of a molten metal, another configuration may be adopted in which a molten metal is allowed to flow from the gate into the hollow portion 12 of the filter main body 10 through the upper end opening portion 12b of the hollow portion 12 and to pass through the peripheral wall portion 11 from inside to outside, and thereafter the molten metal thus filtered is allowed to flow from the outer peripheral surface of the peripheral wall portion 11 into the ring-shaped molten metal passage 30 and to flow from the ring-shaped molten metal passage 30 into the cavity of the casting mold. In this case, the lower end opening portion 12a of the hollow portion 12 is closed so that the molten metal does not flow out therefrom.

In consideration of the effect and efficiency of the above filtration and also the strength of the filter main body, the thickness of the peripheral wall portion of the filter main body may be in a range from 5 to 30 mm, preferably 15 to 25 mm; and the diameter (or the major axis or the diagonal) of the hollow portion (inside diameter of the filter main body) may be in a range from 20 to 80 mm, preferably 40 to 60 mm. The height or length of the filter main body may be in a range from 3 to 1,000 mm, preferably 150 to 650 mm, as described above.

EXAMPLE

The present invention will be more clearly described with reference to the following examples, although the present invention is not limited thereto.

Example

A cylindrical ceramic filter mainly containing silicon carbide and having the outside diameter of 105 mm, inside diameter of 60 mm, and height of 250 mm was arranged as shown in FIGS. 3A and 3B. With respect to the ceramic filter, the number of pores per 2.5 cm in length was set at 6, the bulk specific gravity was set at 0.52, and the porosity was set at 81%. Then, a ductile cast iron melted at 1400° C. was poured in an amount of 1200 kg via the above ceramic filter, and the filtering time was measured. The ceramic filter was produced by forming a reticulated flexible polyurethane foam having no cell membranes into a cylindrical shape, applying a ceramic slurry mainly containing silicon carbide incorporated with alumina as a binder, and drying and sintering the foam applied with the ceramic slurry until the polyurethane foam was removed by carbonization, thereby obtaining a cylindrical ceramic foam having a three-dimensional reticulated skeleton structure with interconnected open cells.

Comparative Example

Figure 4A:
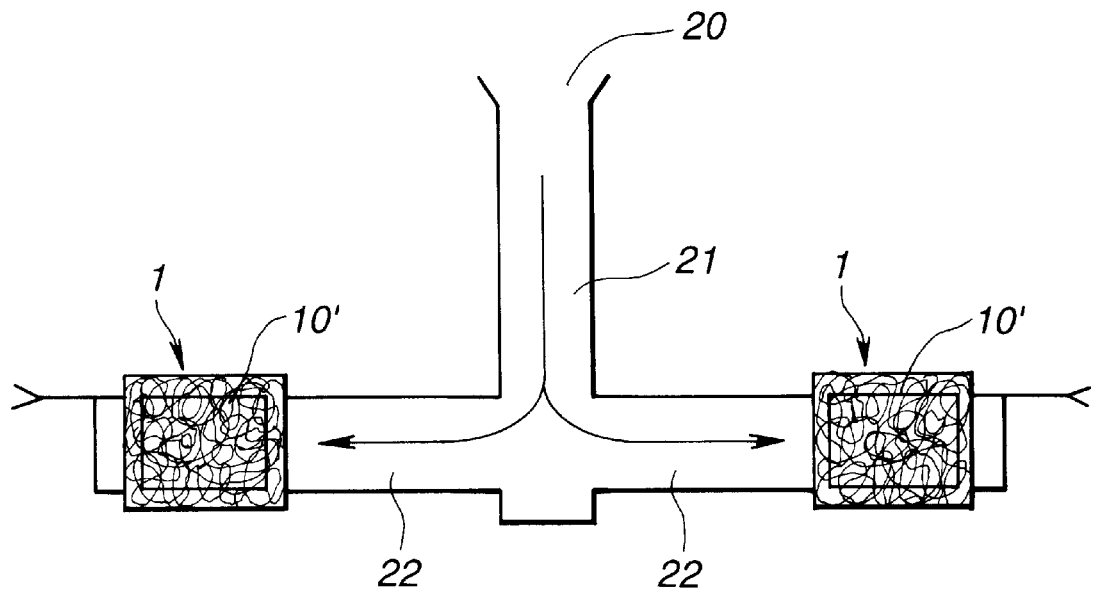
FIGS. 4A and 4B are a sectional front view and a transverse sectional view, respectively, showing one arrangement of a related art ceramic filter.
Figure 4B:
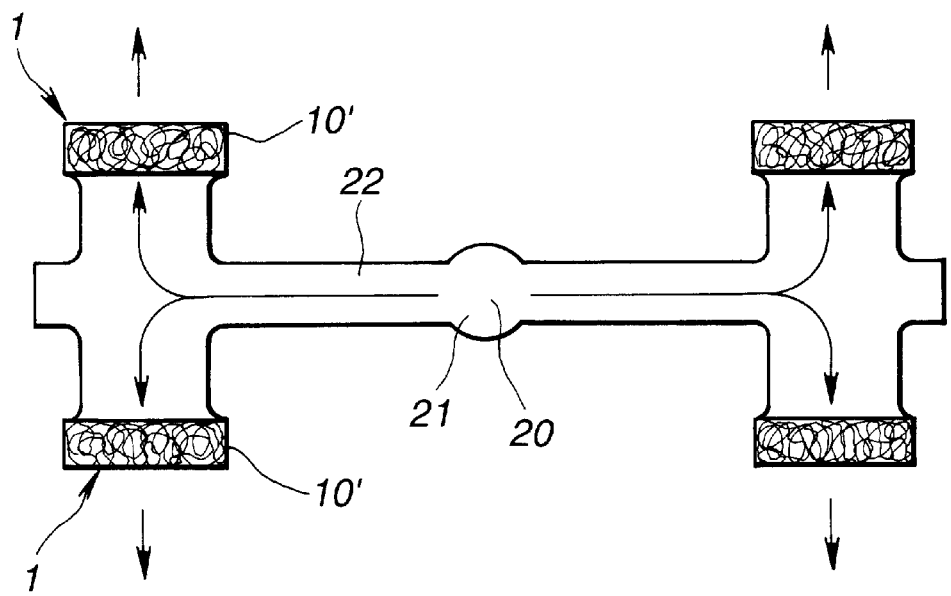

A ceramic filter used in Comparative Example was identical to that in Example in terms of material and characteristic, but in shape and arrangement were different from those in Example. Four pieces of the ceramic filter of Comparative Example, each having a rectangular shape of 75 mm (width)×100 mm (length)×25 mm (thickness), were arranged as shown in FIGS. 4A and 4B. Then, the same ductile cast iron as used in Example was melted in an amount of 1200 kg and was poured into the ceramic filters, and the filtration time was measured. In FIGS. 4A and 4B, reference numeral 1' denotes the ceramic filter used in Comparative Example, which filter includes a rectangular ceramic main body 10'.

The above results are shown in Table 1.

TABLE 1

|  | Example | Comparative Example |
| --- | --- | --- |
| pouring time | 48 sec. | 60 sec. |
| result (*) | no damage | a part of skeleton damage |

(*) The damage state was evaluated by visual observation of the appearance of the filter.

As is apparent from Table 1, it is revealed that the ceramic filter of the present invention is excellent in thermal shock resistance and filtrating performance, and is capable of rapidly, efficiently filtering a molten metal by surface filtration and inner filtration, with the enhanced flowability of the molten metal.

What is claimed is:

1. A ceramic filter to be arranged in a flow passage through which a molten metal is poured from a gate into a cavity of a casting molding, said ceramic filter comprising:
   a ceramic main body of a three-dimensional reticulated skeleton structure having interconnected pores;
   said ceramic body formed into a shape having an inner hollow portion, wherein said ceramic main body has a bulk specific gravity within a range from 0.3 to 0.8; the number of pores within a range from 3 to 40 per 2.5 cm in length along astraight line; and a porosity within a range of 75 to 85%.

2. A ceramic filter according to claim 1, wherein said ceramic man body is made from a ceramic slurry applied on a reticulated synthetic resin foam having no cell membranes and said foam applied with said ceramic slurry is sintered until said foam is removed by carbonization, producing said three-dimensional reticulated skeleton structure.

3. A ceramic filter according to claim 1, wherein said ceramic main body is made from a ceramic having a melting point or sublimating point of 1000° C. or more.

4. A ceramic filter according to claim 1, wherein said shape is selected from an oval, cylinder, triangle, square and pentagonal or more ring-like shape.

5. A ceramic filter according to claim 1, wherein the height or length of said main body is in a range of 3 to 1,000 mm.

6. A ceramic filter according to claim 1, wherein the bulk specific gravity of the main body is in a range of 0.45 to 0.7.

7. A ceramic filter according to claim 1, wherein the number of pores is in a range of 6 to 13.

8. A method of filtering a molten metal, comprising the steps of:

arranging said ceramic filter described in claim 1 in a flow passage through which a molten metal having foreign matter is poured from a gate into a cavity of a casting mold in such a manner that the molten metal is allowed to flow from outside of a peripheral wall portion of the filter main body of said ceramic filter into an inner hollow portion of the filter main body through interconnected pores of the peripheral wall portion and to flow out of the filter main body through a lower end opening portion of the filter main body; and allowing the molten metal to flow in the filter main body through the peripheral wall portion and to flow out of the filter main body through the lower end opening portion of the filter main body, thereby removing foreign matter in the molten metal when the molten metal passes through the interconnected pores of the peripheral wall portion of the filter main body.

9. A method of filtering a molten metal, comprising the steps of:

arranging said ceramic filter described in claim 1 in a flow passage through which a molten metal having foreign matter is poured from a gate into a cavity of a casting mold in such a manner that the molten metal is allowed to flow from an upper end opening portion of the filter main body of said ceramic filter into an inner hollow portion of the filter main body and to flow out of the filter main body through a peripheral portion of the filter main body; and allowing the molten metal to flow into the ceramic main body from the upper end opening portion of the filter main body and to flow out of the filter main body through interconnected pores of the peripheral wall portion of the filter main body, thereby removing foreign matter in the molten metal when the molten metal passes through the interconnected pores of the peripheral wall portion of the filter main body.

* * * * *